United States Patent Office 3,238,182
Patented Mar. 1, 1966

3,238,182
SOLID SULFURIC ACID COMPOSITION
Judson E. Goodrich, San Rafael, Calif., assignor to Chevron Research Company, a corporation of Delaware
No Drawing. Filed Mar. 30, 1962, Ser. No. 183,767
2 Claims. (Cl. 260—67)

This application is a continuation-in-part of U.S. Serial No. 88,275, filed February 10, 1961, now Patent No. 3,167,530.

This invention pertains to a solid sulfuric acid composition. More specifically, this invention involves a solid sulfuric acid formolite resin.

The novel sulfuric acid formolite resin is useful as an esterification catalyst. It is also useful in treatment of petroleum distillates lighter than gas oil and in epoxidation systems where sulfuric acid or ion exchange resins have been previously used. (See U.S. Patents 2,801,252 and 2,919,283.) Generally, the novel resin is useful in other organic reactions where sulfuric acid has been employed.

One problem with sulfuric acids has been the disadvantages associated with separation and residuary contamination. Another problem has been in the uncontrollable reaction rate in certain applications.

According to the present invention a novel solid sulfuric acid composition is prepared by reacting an aromatic compound selected from the group consisting of benzene and substituted benzene compounds, said substituents being selected from the class consisting of lower alkyl radicals and phenyl and lower alkyl phenyl radicals, an aldehyde selected from the class consisting of formaldehyde, paraformaldehyde and methylal, and concentrated sulfuric acid, the reaction being carried out by intimately mixing said components with a dispersant in a solvent selected from the group consisting of halogenated hydrocarbons and hydrocarbons at temperatures below about 120° F.

The solid sulfuric acid formolite resin of this invention can be used to a great advantage in esterification and other sulfuric acid organic reactions. The novel solid sulfuric acid composition is easily separable from reaction solutions by means such as filtration and gravitational separation (e.g. centrifuging, settling or flow sedimentation). An additional advantage is the elimination of washing and neutralizing steps which are present in most sulfuric acid uses.

Other known resinous catalysts where the sulfuric acid is chemically incorporated in the lattice structure are not as potent and not as labile as in the superior resin of this invention.

As already mentioned, the novel acidic formolite resins, according to this invention, are prepared by reacting an aromatic hydrocarbon, an aldehyde and sulfuric acid.

Suitable aromatic compounds are selected from the class consisting of benzene and mono-, di- or trihydrocarbon substituted benzenes, naphthalene, alkyl naphthalenes and phenanthrene. Other substituents are aliphatic ethers, e.g. alkyl ethers wherein the alkyl moiety is from 1 to 6 carbon atoms. The hydrocarbon substituents are selected from the class consisting of lower alkyl radicals of from 1 to 6 carbon atoms, phenyl radicals and alkyl phenyl radicals. Benzene and lower alkyl di-substituted benzene compounds are preferred. Examples of suitable aromatic compounds are benzene, n-butyl benzene, toluene, o-xylene, m-xylene, p-xylene, biphenyl, cumene and p-cymene, naphthalene, mono-, di-, and trinuclear alkyl ethers such as anisole, α-methylnaphthalene and phenanthrene.

Suitable aldehydes are selected from the class consisting of formaldehyde, paraformaldehyde, metaformaldehyde, hemi-formals monohydroxy or polyhydroxy alcohol reaction products with formaldehyde. Examples of homologous acyclic products are methylal and ethylal. Cyclic reaction products of from 3 to 6 carbon atoms in a ring are included. Examples of suitable cyclic compounds are 1,3-dioxolanes, 1,3-dioxanes, and higher ring homologues thereof. Formaldehyde is the preferred component.

The strengths of the acid should be above 90 percent. Preferably, the sulfuric acid has a concentration of from 90 to 97% by weight. A dilution effect on sulfuric acid during the reaction should be compensated by using stronger acid or adding stronger acid portionwise.

The mole ratio of formaldehyde to aromatic hydrocarbon may vary from 0.25 to about 2.5. It is desirable to use more than 1.5 mole of formaldehyde per mole of the aromatic constituent. A lesser amount will give lower yields of the resin.

The sulfuric acid is employed in excess over the amount needed for the resin in order that the acidic resin contain active sulfuric acid. From 1 mole to 10 moles of sulfuric acid to 1 mole of aromatic hydrocarbon may be employed.

The preparation of the acidic resin is carried out by intimately mixing the above components in a suitable solvent in the presence of a dispersant. Effective solvents are chlorinated hydrocarbons such as carbon tetrachloride, trichloroethane, trichlorohexane, trichloroheptane. In addition to solubilizing, the solvents serve to minimize the sulfonation of the aromatic compound, thus favoring the resin formation. Other suitable solvents are cracked naphtha and saturated hydrocarbon solvents, such as hexane, heptane, Pearl Oil.

The formation of acidic formaldehyde resin proceeds by emulsion resinification mechanism, and, therefore, requires the use of a dispersant as already mentioned. Generally, dispersants which aid in reducing the sulfuric acid droplet size are suitable. Useful dispersants are copolymers such as a condensation product of maleic anhydride and alkyl methacrylate (the ester alkyls are of $C_{10}$ to $C_{18}$ carbon atoms); a copolymer of an alkyl methacrylate and methacrylic acid, and polyglycol methacrylates. The polyglycols are polyethylene glycol, polypropylene glycol and other homologous branched and straight-chain glycols. Examples of suitable polymers are found in U.S. Patents 2,892,779, 2,892,783 and 2,892,818.

Other dispersants are metal sulfonates, such as calcium petroleum sulfonates, or more broadly alkaline metal petroleum sulfonates and alkaline metal alkyl benzene sulfonates. Still others are low molecular weight cationic detergents, such as partially dehydrated triamide reaction product of tetraethylene pentamine and branched-chain octadecanoic acid; quaternary alkyl ammonium compounds; alkyl esters of glycerine, and alkenyl succinic anhydride.

The dispersant is used in an amount sufficient to emulsify the sufuric acid in the solvent. The amount may vary with the particular dispersant employed. Generally, it is from 0.1 to 1.0 volume percent based on the solvent.

In order to synthesize the resinous lattice, catalysts such as sulfuric and hydrofluoric acids are employed. To prepare the acidic formolite resin in one step an excess amount of sulfuric acid is used. It acts first as a catalyst, while the excess is incorporated in the resinous lattice. If hydrofluoric acid is used initially sulfuric acid is added subsequently to produe the finished sulfuric acid resin. Sulfuric acid is also used to regenerate the acidic formolite resin to its original strength, if desired.

It is important that the temperature of the reactants be below 120° F. From 35° F. to 120° F. is an acceptable working range. The preferred operating temperature is below about 90° F.

It is essential that the raection components be thorougly and intimately mixed during the reaction in order to obtain a finely divided product.

Prior to the present invention the conventional reaction of formaldehyde and aromatic hydrocarbons was described in the art. Products from this reaction are unusable and unadaptable for the present purpose. Nastyukov, J. Russ, Phys. Chem. Soc., vol. 35, p. 824, (1903), called the reaction of formaldehyde and an arene (an aromatic compound) a "formolite reaction" and the products have been called since then "formolite resins."

Two distinct types of resins result from the prior art reaction. One of the resinous products is a high melting substantially oxygen-free resin soluble in most organic solvents and melting at about 200° F. The second product is an infusible resin, generally, insoluble in all common solvents and containing oxygen.

The sulfuric acid formolite resin of this invention is a black granular solid. It absorbs moisture the same as sulfuric acid. It can be titrated with a base. When stored in a desiccator for a prolonged period some $SO_2$ is given off. The indication is that sulfuric acid oxidizes the supporting organic matter. If the sulfuric acid was chemically bound it would generally not oxidize the support material. Neutralizing the sulfuric acid formolite resin with a base changes its color to tan. In its neutralized state the resin is a talc-like powder stable up to about 700° F. in air. Above this temperature the resin sinters and darkens. The neutralized benzene formaldehyde resin (the lattice) has a surface area of approximately 110 m.$^2$/gr. According to nitrogen adsorption measurements the individual particles are less than 0.1 micron in diameter but tend to form clusters several microns in size. The ash content of the neutralized resinous lattice is about 0.1%. Active sulfuric acid up to about 80% by weight is incorporated in the resin. This composition will not attack a filter paper while compositions with higher sulfuric acid content will destroy the paper.

It is not known exactly by what mechanism the sulfuric acid is held in the resinous aromatic-formaldehyde lattice. It appears to be a different mechanism than that of cationic exchange resins because most polar solvents will elute the labile sulfuric acid from the matrix. Simple hydrocarbon solvents like hexane however, will not dislodge the sulfuric acid from the resin support. Upon neutralization the acid is removed from the resin. The formolite resin support is inert and does not interfere with the sulfuric acid organic reactions.

Typical preparations of the new sulfuric acid composition are illustrated in the following examples. Unless otherwise specified, the proportions are on a weight basis.

EXAMPLE I

Carbon tetrachloride (640 ml.), benzene (82.7 g.), concentrated sulfuric acid (686 g. of 95.5–96.5%) and calcium petroleum sulfonate (2 g.—derived from a lubricating oil having a viscosity of 480 SSU at 100° F.) were introduced into a vessel and vigorously agitated. 44.0 g. of paraformaldehyde (1.5 mole) was slowly added keeping the temperature below about 90° F. The product was filtered and washed with benzene. The filtrate was neutral. The acid was all retained in the black solid precipitate. The yield of the wet product was 867.9 g., 11.9% of the product was solvent; 9.2% resin and 78.9% sulfuric acid.

EXAMPLE II

A mixture of 41.4 g. benzene (0.53 mole), 345 g. of 96% sulfuric acid, 1 g. calcium petroleum sulfonate (derived from lubricating oil having a viscosity of 480 SSU at 100° F.) and 960 ml. of $CCl_4$ were introduced into a vessel having means for vigorous agitation. To the rapidly stirred mixture was added dropwise 60 g. of 38% formaldehyde (0.76 mole). The reaction temperature was kept below about 90° F. The resulting thick reddish-black slurry was filtered and washed with water. The catalyst is then ready for use in esterification reactions.

EXAMPLE III

A mixture of 44 g. benzene (0.56 mol), 200 ml. of 98% sulfuric acid, 16 ml. of a copolymer of lauryl methacrylate and maleic anhydride having a molecular weight of about 100,000 (25% $CCl_4$) were introduced into a vessel having means for vigorous agitation. To the rapidly and violently stirred mixture was added dropwise 62.0 g. (0.82 mole) of methylal. The reaction temperature was kept below about 90° F. At the conclusion of the reaction, the product was filtered directly through a Fiberglas filter. The filtrate was clear and homogeneous and consisted of about 600 ml. of carbon tetrachloride. The recovered filter residue contained 90.5% of the benzene charged.

Typical application of the new sulfuric catalyst is illustrated below.

Preparation of n-butyl oleate

A flask equipped with a stirrer, reflux condenser and water take-off was charged with oleic acid, n-butanol and toluene solvent. Subsequently, the respective esterification catalyst was added and the solution heated to reflux, and the rate of water formation was measured. The following table embodies the results obtained according to the procedure above.

|  | Example I | Example II |
|---|---|---|
| Oleic acid 97% | 72.8 g. (0.25 mole) | 72.8 g. (0.25 mole). |
| n-Butanol | 20.4 g. (0.275 mole) | 20.4 g. (0.275 mole). |
| Toluene | 100 ml | 100 ml. |
| Acidic formolite resin |  | 2.4 g. (about 75% active $H_2SO_4$). |
| $H_2SO_4$ (95.5–96.5%) | 1.65 g |  |
| Water removed | 6.0 ml., 80 min | 6.0 ml., 50 min. |
| Appearance of product during reaction. | Mixture very dark after 15 min. | Mixture darkened some after 20–30 min.; lighter than in Example I at conclusion of reaction. |
| Yield | 84.2 g | 85.0 g. |
| Theoretical yield | 84.7 g | 84.7 g. |

I claim:

1. A solid sulfuric acid composition prepared by reacting a mixture consisting of a benzene compound selected from the group consisting of benzene and lower alkyl substituted benzenes, said lower alkyl groups containing from 1 to 6 carbon atoms each, an aldehyde selected from the class consisting of formaldehyde, paraformaldehyde and methylal, the mole ratio of aldehyde to benzene compound being from about 0.25 to about 2.5, and concentrated sulfuric acid, there being from 1 mole to 10 moles of sulfuric acid for each mole of benzene compound and said sulfuric acid having a concentration of from 90 to 97% by weight, the reaction being carried out by intimately mixing said components with a dispersant selected from the group consisting of alkaline earth metal petroleum sulfonates and copolymers of maleic anhydride and alkyl methacrylate having 10 to 18 carbon atoms in the alkyl group in a solvent selected from the group consisting of halogenated hydrocarbons and hydrocarbons at temperatures below about 120° F., said dispersant being in an amount sufficient to emulsify the sulfuric acid in the solvent and separating the solid sulfuric acid composition reaction product containing said 1 mole to 10 moles of sulfuric acid.

2. A solid sulfuric acid composition according to claim 1, wherein the said composition is prepared from benzene, formaldehyde, and 95.5–96.5% concentrated sulfuric acid.

References Cited by the Examiner

UNITED STATES PATENTS

| | | | |
|---|---|---|---|
| 1,827,538 | 10/1931 | Nastukoff | 260—67 |
| 2,200,763 | 5/1940 | Anderson et al. | 260—67 |
| 2,568,313 | 9/1951 | Woolhouse | 260—67 |
| 2,713,571 | 7/1955 | Gordon et al. | 260—67 |

OTHER REFERENCES

Ellis: The Chemistry of Synthetic Resins, vol. 11, pp. 211–214 (1935), Reinhold Publishing Corp., New York, N. Y.

WILLIAM H. SHORT, *Primary Examiner.*

JOSEPH R. LIBERMAN, *Examiner.*